United States Patent
Inase et al.

(10) Patent No.: US 11,585,415 B2
(45) Date of Patent: Feb. 21, 2023

(54) CONTINUOUSLY VARIABLE TRANSMISSION

(71) Applicant: TOYOTA JIDOSHA KABUSHIKI KAISHA, Toyota (JP)

(72) Inventors: Yu Inase, Susono (JP); Keisuke Ninomiya, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/948,686

(22) Filed: Sep. 29, 2020

(65) Prior Publication Data
US 2021/0207691 A1 Jul. 8, 2021

(30) Foreign Application Priority Data
Jan. 8, 2020 (JP) .............................. JP2020-001625

(51) Int. Cl.
*F16H 9/18* (2006.01)
*F16G 5/16* (2006.01)

(52) U.S. Cl.
CPC ........... *F16H 9/18* (2013.01); *F16G 5/16* (2013.01)

(58) Field of Classification Search
CPC ............. F16H 55/56; F16H 9/18; F16H 55/38
USPC .............................................................. 474/8
See application file for complete search history.

(56) References Cited

U.S. PATENT DOCUMENTS

| | | | | |
|---|---|---|---|---|
| 4,781,660 A | * | 11/1988 | Amataka | F16H 9/24 474/174 |
| 4,790,799 A | * | 12/1988 | Sadler | F16H 55/49 474/201 |
| 4,898,567 A | * | 2/1990 | Tatara | F16H 55/38 474/201 |
| 6,379,275 B1 | * | 4/2002 | Serkh | F16G 5/16 474/49 |
| 7,189,171 B2 | * | 3/2007 | Takemura | F16C 33/64 384/492 |
| 7,648,435 B2 | * | 1/2010 | Ishida | F16G 5/166 106/36 |
| 7,958,635 B2 | * | 6/2011 | Yoshida | B24B 39/04 474/174 |
| 10,132,391 B2 | * | 11/2018 | Duan | F16H 9/18 |

(Continued)

FOREIGN PATENT DOCUMENTS

| WO | WO 2012/144023 A1 | 10/2012 |
|---|---|---|
| WO | WO2013/046367 A1 | 4/2013 |

*Primary Examiner* — Henry Y Liu
(74) *Attorney, Agent, or Firm* — Oblon, McClelland, Maier & Neustadt, L.L.P.

(57) ABSTRACT

Provided is a continuously variable transmission including: a first pulley including a first fixed sheave fixed to a first rotating shaft and a first movable sheave rotating integrally with the first rotating shaft and is movable along the first rotating shaft; a second pulley including a second fixed sheave fixed to a second rotating shaft and a second movable sheave rotating integrally with the second rotating shaft and is movable along the second rotating shaft; and a transmission belt wrapped around a belt wrapping groove formed on the first pulley and around a belt wrapping groove formed on the second pulley. In a belt track for a minimum gear ratio, surfaces of the first pulley that are in contact with the transmission belt have a lower coefficient of friction relative to the transmission belt than surfaces of the second pulley that are in contact with the transmission belt.

6 Claims, 9 Drawing Sheets

(56) References Cited

U.S. PATENT DOCUMENTS

| | | | | |
|---|---|---|---|---|
| 2005/0217111 | A1* | 10/2005 | Yoshida | B24B 39/04 29/90.01 |
| 2007/0004543 | A1* | 1/2007 | Ishida | F16H 55/38 474/237 |
| 2007/0117663 | A1* | 5/2007 | Van Der Leest | F16H 55/56 474/201 |
| 2007/0197319 | A1* | 8/2007 | Vornehm | F16H 55/56 474/8 |
| 2008/0058137 | A1* | 3/2008 | Tay | F16H 55/56 474/8 |
| 2008/0096703 | A1* | 4/2008 | Labbe | F16H 55/56 474/8 |
| 2011/0250998 | A1* | 10/2011 | Hizuka | F16C 33/62 474/8 |
| 2012/0088615 | A1* | 4/2012 | Briggs | C23C 14/0641 474/8 |
| 2013/0303316 | A1* | 11/2013 | Sano | F16G 5/166 474/8 |
| 2014/0038755 | A1* | 2/2014 | Ijichi | F16H 55/38 474/11 |
| 2017/0314676 | A1* | 11/2017 | Huang | F16H 9/24 |

\* cited by examiner

CONTINUOUSLY VARIABLE TRANSMISSION

CROSS-REFERENCE TO RELATED APPLICATION

This application claims priority to Japanese Patent Application No. 2020-001625 filed on Jan. 8, 2020, incorporated herein by reference in its entirety.

BACKGROUND

1. Technical Field

The present disclosure relates to a continuously variable transmission.

2. Description of Related Art

The belt-driven continuously variable transmission described in WO 2012/144023 includes two rotating shafts disposed parallel to each other, a drive pulley and an idler pulley provided respectively on these rotating shafts, and a transmission belt wrapped around belt wrapping grooves that are V-shaped grooves formed in the drive pulley and the idler pulley. When power from a power source mounted in the vehicle is input into the drive pulley through the rotating shaft, the power is transmitted from the drive pulley to the transmission belt by the force of friction between the drive pulley and the transmission belt. When power is transmitted from the transmission belt to the idler pulley by the force of friction between the idler pulley and the transmission belt, the power is transmitted from the idler pulley to drive wheels through the rotating shaft. Each of the drive pulley and the idler pulley is composed of a conical fixed sheave that is fixed to the rotating shaft and a conical movable sheave that is movable in an axial direction on the rotating shaft, with tapered surfaces, facing each other, of the fixed sheave and the movable sheave forming the belt wrapping groove. Changing the widths of the belt wrapping grooves of the drive pulley and the idler pulley results in changes to the wrapping radius of the transmission belt, which is how the gear ratio can be continuously changed within a range between a maximum gear ratio and a minimum gear ratio. In the continuously variable transmission described in WO 2012/144023, a coefficient of friction between a radially outer portion of each tapered surface of the idler pulley and the transmission belt is set to be lower than a coefficient of friction between a radially inner portion thereof and the transmission belt.

SUMMARY

In a belt-driven continuously variable transmission, a belt track for the transmission belt to run on at a minimum gear ratio is located at a radially outer portion of the drive pulley and a radially inner portion of the idler pulley. At the minimum gear ratio, a relatively large thrust force is exerted in the drive pulley to maintain the narrow width of the belt wrapping groove in the drive pulley. Subjected to this thrust force, the fixed sheave and the movable sheave of the drive pulley that hold the transmission belt therebetween undergo sheave deformation in which these sheaves warp outward in the axial direction. When such sheave deformation occurs, for example, the transmission belt moves radially outward compared with when the sheaves are not deformed, and thus the belt track shifts, at the side of the drive pulley where the transmission belt enters the drive pulley from the idler pulley side. Here, the fixed sheave and the movable sheave of the drive pulley are warped outward in the axial direction. Therefore, at the side of the drive pulley where the transmission belt enters the drive pulley, the area of contact between the drive pulley and the transmission belt becomes smaller than that when the sheaves are not deformed, resulting in a power transmission loss between the drive pulley and the transmission belt.

The present disclosure provides a continuously variable transmission that can reduce the power transmission loss at a minimum gear ratio.

An aspect of the present disclosure relates to a continuously variable transmission including a first pulley, a first thrust-force generating device, a second pulley, a second thrust-force generating device, and a transmission belt. The first pulley includes a first fixed sheave that is fixed to a first rotating shaft and a first movable sheave that rotates integrally with the first rotating shaft and is movable along the first rotating shaft, and the first pulley is configured such that power from a power source mounted in a vehicle is transmitted to the first pulley through the first rotating shaft. The first thrust-force generating device is configured to generate a thrust force that pushes the first movable sheave toward the first fixed sheave. The second pulley includes a second fixed sheave that is fixed to a second rotating shaft and a second movable sheave that rotates integrally with the second rotating shaft and is movable along the second rotating shaft, and the second pulley is configured to transmit power to a drive wheel of the vehicle through the second rotating shaft. The second thrust-force generating device is configured to generate a thrust force that pushes the second movable sheave toward the second fixed sheave. The transmission belt is configured to transmit power by being wrapped around a first belt wrapping groove formed in the first pulley by tapered surfaces, facing each other, of the first fixed sheave and the first movable sheave and around a second belt wrapping groove formed in the second pulley by tapered surfaces, facing each other, of the second fixed sheave and the second movable sheave. The continuously variable transmission is configured to steplessly change a gear ratio within a range between a maximum gear ratio and a minimum gear ratio by continuously changing the width of the first belt wrapping groove and the width of the second belt wrapping groove. In a belt track for the transmission belt to run on at the minimum gear ratio, a coefficient of friction of each of the tapered surfaces of the first fixed sheave and the first movable sheave relative to the transmission belt at a portion in contact with the transmission belt is lower than a coefficient of friction of each of the tapered surfaces of the second fixed sheave and the second movable sheave at a portion in contact with the transmission belt.

Setting the transmission belt on the belt track for the minimum gear ratio in the first pulley of the continuously variable transmission of the above aspect of the present disclosure requires a force that pushes up the transmission belt radially outward from the tapered surfaces of the first fixed sheave and the first movable sheave (hereinafter referred to as "the tapered surfaces of the first pulley"). The magnitude of this push-up force is determined by a thrust force exerted in the first pulley and the coefficient of friction of each tapered surface of the first pulley relative to the transmission belt at the portion in contact with the transmission belt. In the continuously variable transmission of the above aspect of the present disclosure, the thrust force exerted in the first pulley can be reduced compared with when, in the belt track for the minimum gear ratio, each tapered surface of the first pulley has the same coefficient of friction relative to the transmission belt at the portion in contact with the transmission belt as each of the tapered surfaces of the second fixed sheave and the second movable sheave (hereinafter referred to as "the tapered surfaces of the second pulley") does at the portion in contact with the transmission belt. Since the thrust force exerted in the first pulley at the minimum gear ratio can be thus reduced, sheave deformation in which the first fixed sheave and the first movable sheave holding the transmission belt therebetween warp outward in the axial direction can be mitigated accordingly, so that shift of the belt track can be reduced. As a result, power transmission loss between the first pulley and the transmission belt at the minimum gear ratio can be reduced. Moreover, in the continuously variable transmission of the above aspect of the present disclosure, the force of friction occurring between each tapered surface of the second pulley and the transmission belt can be relatively increased compared with when, in the belt track for the minimum gear ratio, each tapered surface of the second pulley has the same coefficient of friction relative to the transmission belt at the portion in contact with the transmission belt as each tapered surface of the first pulley does at the portion in contact with the transmission belt. Thus, the transmission belt is less likely to slip over the tapered surfaces of the second pulley at the minimum gear ratio, so that power transmission loss between the second pulley and the transmission belt can be reduced. In this way, the continuously variable transmission of the above aspect of the present disclosure can reduce the power transmission loss at the minimum gear ratio.

In the continuously variable transmission of the above aspect, a coefficient of friction of each of the tapered surfaces of the first fixed sheave and the first movable sheave relative to the transmission belt at a radially outer portion may be lower than a coefficient of friction of each of the tapered surfaces of the first fixed sheave and the first movable sheave relative to the transmission belt at a radially inner portion.

In the continuously variable transmission thus configured, each of the tapered surfaces of the first fixed sheave and the first movable sheave of the first pulley can be divided into two regions with different coefficients of friction, one at the radially outer portion and the other at the radially inner portion, and the radially outer portion that forms the belt track for the minimum gear ratio can be designated as a low coefficient-of-friction region with a relatively low coefficient of friction.

In the continuously variable transmission of the above aspect, a coefficient of friction of each of the tapered surfaces of the second fixed sheave and the second movable sheave relative to the transmission belt at a radially inner portion may be higher than a coefficient of friction of each of the tapered surfaces of the second fixed sheave and the second movable sheave relative to the transmission belt at a radially outer portion.

In the continuously variable transmission thus configured, each of the tapered surfaces of the second fixed sheave and the second movable sheave of the second pulley can be divided into two regions with different coefficients of friction, one at the radially outer portion and the other at the radially inner portion, and the radially inner portion that forms the belt track for the minimum gear ratio can be designated as a high coefficient-of-friction region with a relatively high coefficient of friction.

In the continuously variable transmission of the above aspect, in a belt track for the transmission belt to run on at the maximum gear ratio, a coefficient of friction of each of the tapered surfaces of the second fixed sheave and the second movable sheave relative to the transmission belt at a portion in contact with the transmission belt may be lower than a coefficient of friction of each of the tapered surfaces of the first fixed sheave and the first movable sheave at a portion in contact with the transmission belt.

In the continuously variable transmission thus configured, a thrust force exerted in the second pulley at the maximum gear ratio can be reduced to mitigate sheave deformation in which the second fixed sheave and the second movable sheave that hold the transmission belt therebetween warp outward in the axial direction, so that shift of the belt track can be reduced. As a result, power transmission loss between the second pulley and the transmission belt at the maximum gear ratio can be reduced. Moreover, the force of friction occurring between each tapered surface of the second pulley and the transmission belt in the belt track for the maximum gear ratio can be relatively increased. Thus, the transmission belt is less likely to slip over the tapered surfaces of the second pulley, so that power transmission loss between the second pulley and the transmission belt can be reduced. In this way, power transmission loss at the maximum gear ratio can be reduced.

In the continuously variable transmission of the above aspect, the transmission belt may be a metal belt provided by threading, through a circular ring, a plurality of elements of which both side surfaces in a width direction make contact with the tapered surfaces. Here, the circular ring may be a ring provided by layering a plurality of rings.

The continuously variable transmission thus configured can reduce the power transmission loss between each tapered surface and the elements.

In the continuously variable transmission according to the present disclosure, the thrust force exerted in the first pulley can be reduced compared with when, in the belt track for the minimum gear ratio, each tapered surface of the first pulley has the same coefficient of friction relative to the transmission belt at the portion in contact with the transmission belt as each of the tapered surfaces of the second fixed sheave and the second movable sheave does at the portion in contact with the transmission belt. Since the thrust force exerted in the first pulley at the minimum gear ratio can be thus reduced, sheave deformation in which the first fixed sheave and the first movable sheave holding the transmission belt therebetween warp outward in the axial direction can be mitigated accordingly, so that shift of the belt track can be reduced. As a result, power transmission loss between the first pulley and the transmission belt at the minimum gear ratio can be reduced. Moreover, in the continuously variable transmission according to the present disclosure, the force of friction occurring between each tapered surface of the second pulley and the transmission belt can be relatively increased compared with when, in the belt track for the minimum gear ratio, each tapered surface of the second pulley has the same coefficient of friction relative to the transmission belt at the portion in contact with the transmission belt as each tapered surface of the first pulley does at the portion in contact with the transmission belt. Thus, the transmission belt is less likely to slip over the tapered surfaces of the second pulley at the minimum gear ratio, so that power transmission loss between the second pulley and the transmission belt can be reduced. As such, the continuously variable transmission according to the present disclosure has the advantage of being able to reduce the power transmission loss at the minimum gear ratio.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment of a continuously variable transmission according to the present disclosure will be described below. The present disclosure is not limited by this embodiment.

Figure 1:
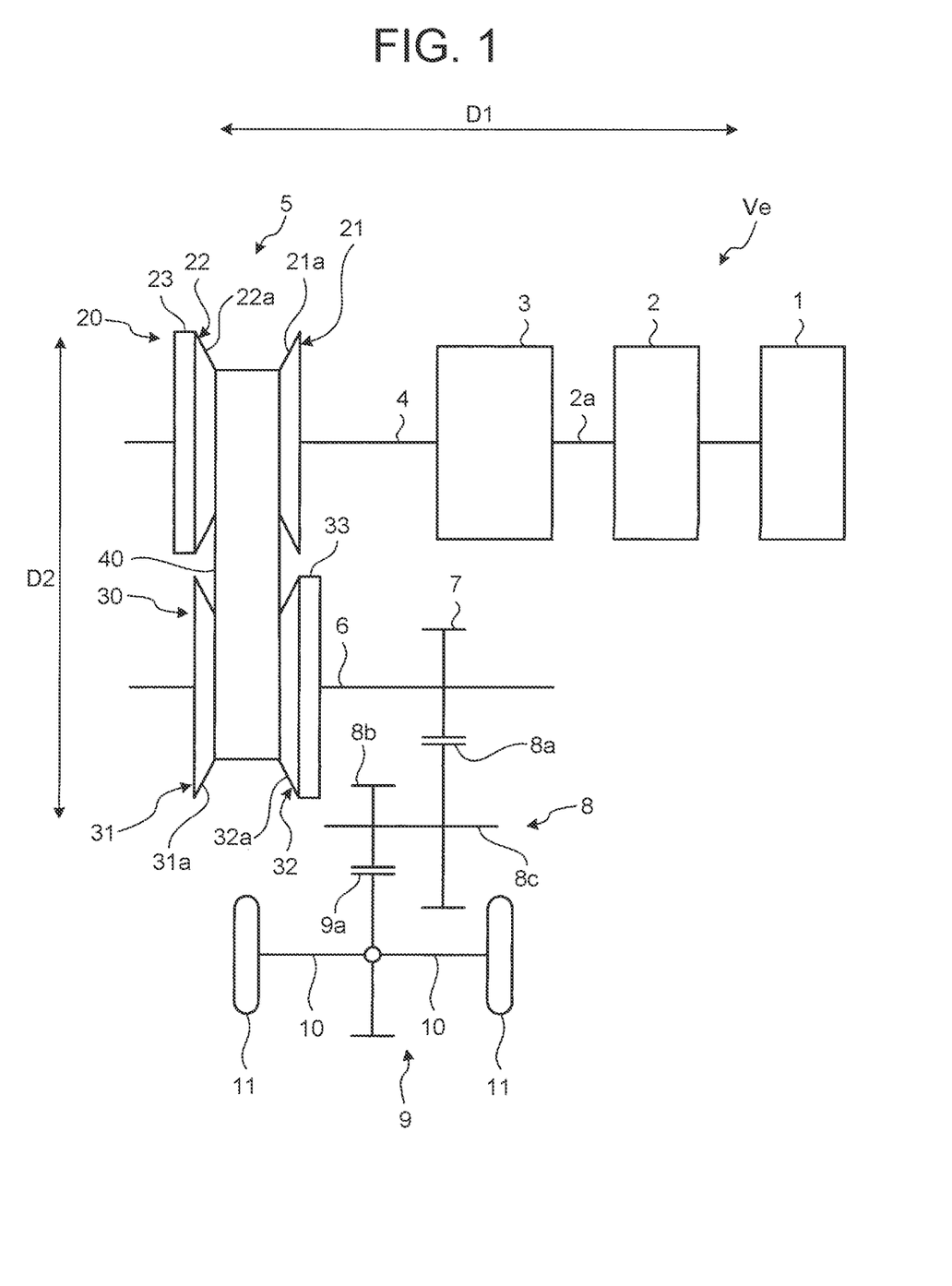
FIG. 1 is a skeleton diagram schematically showing a power transmission mechanism of a vehicle equipped with a continuously variable transmission of one embodiment of the present disclosure.

FIG. 1 is a skeleton diagram schematically showing a power transmission mechanism of a vehicle Ve equipped with a continuously variable transmission 5. As shown in FIG. 1, the vehicle Ve includes an engine 1 as a power source. Power output from the engine 1 is input into the belt-driven continuously variable transmission 5 through a torque converter 2, a forward-backward travel switching mechanism 3, and an input shaft 4, and is transmitted from the continuously variable transmission 5 to a counter gear mechanism 8, a differential mechanism 9, axles 10, and drive wheels 11 through an output shaft 6 and an output gear 7. The input shaft 4 is one example of the "first rotating shaft" of the present disclosure, and the output shaft 6 is one example of the "second rotating shaft" of the present disclosure.

The torque converter 2 and the forward-backward travel switching mechanism 3 are coupled to each other through a turbine shaft 2a so as to be able to transmit power. The forward-backward travel switching mechanism 3 is a mechanism that selectively switches the rotation direction of the input shaft 4 relative to the rotation direction of the turbine shaft 2a between the same direction and the opposite direction. The forward-backward travel switching mechanism 3 is composed of, for example, a planetary gear mechanism and a plurality of engaging devices. The forward-backward travel switching mechanism 3 is coupled to the continuously variable transmission 5 through the input shaft 4 so as to be able to transmit power.

The continuously variable transmission 5 includes a primary pulley 20 that is a first pulley, a secondary pulley 30 that is a second pulley, and a transmission belt 40 that is wrapped around belt wrapping groves formed in the primary pulley 20 and the secondary pulley 30. The primary pulley 20 rotates integrally with the input shaft 4. The secondary pulley 30 rotates integrally with the output shaft 6. In the example shown in FIG. 1, a primary shaft that is a rotating shaft of the primary pulley 20 is provided by the input shaft 4. A secondary shaft that is a rotating shaft of the secondary pulley 30 is provided by the output shaft 6.

The primary pulley 20 includes a fixed sheave 21 that is fixed to the input shaft 4, a movable sheave 22 that is relatively movable in an axial direction D1 on the input shaft 4, and a first hydraulic chamber 23 that is a first thrust-force generating device for applying a thrust force to the movable sheave 22. The movable sheave 22 is spline-fitted on the input shaft 4, and therefore the movable sheave 22 and the input shaft 4 rotate integrally. A first belt wrapping groove of the primary pulley 20 (hereinafter referred to as "the V-groove of the primary pulley 20") is formed by a tapered surface 21a of the fixed sheave 21 and a tapered surface 22a of the movable sheave 22. The first hydraulic chamber 23 is disposed on a back side of the movable sheave 22 (the side opposite from the tapered surface 22a) and generates a thrust force as a force that hydraulically pushes the movable sheave 22 toward the fixed sheave 21 in the axial direction D1. This thrust force causes the movable sheave 22 to move in the axial direction D1, thereby changing the width of the V-groove of the primary pulley 20. The fixed sheave 21 is one example of the "first fixed sheave" of the present disclosure. The movable sheave 22 is one example of the "first movable sheave" of the present disclosure.

The secondary pulley 30 includes a fixed sheave 31 that is fixed to the output shaft 6, a movable sheave 32 that is relatively movable in the axial direction D1 on the output shaft 6, and a second hydraulic chamber 33 that is a second thrust-force generating device for applying a thrust force to the movable sheave 32. The movable sheave 32 is spline-fitted on the output shaft 6, and therefore the movable sheave 32 and the output shaft 6 rotate integrally. A second belt wrapping groove of the secondary pulley 30 (hereinafter referred to as "the V-groove of the secondary pulley 30") is formed by a tapered surface 31a of the fixed sheave 31 and a tapered surface 32a of the movable sheave 32. The second hydraulic chamber 33 is disposed on a back side of the movable sheave 32 and generates a thrust force as a force that hydraulically pushes the movable sheave 32 toward the fixed sheave 31 in the axial direction D1. This thrust force causes the movable sheave 32 to move in the axial direction D1, thereby changing the width of the V-groove of the secondary pulley 30. The fixed sheave 31 is one example of the "second fixed sheave" of the present disclosure. The movable sheave 32 is one example of the "second movable sheave" of the present disclosure.

Figure 2:
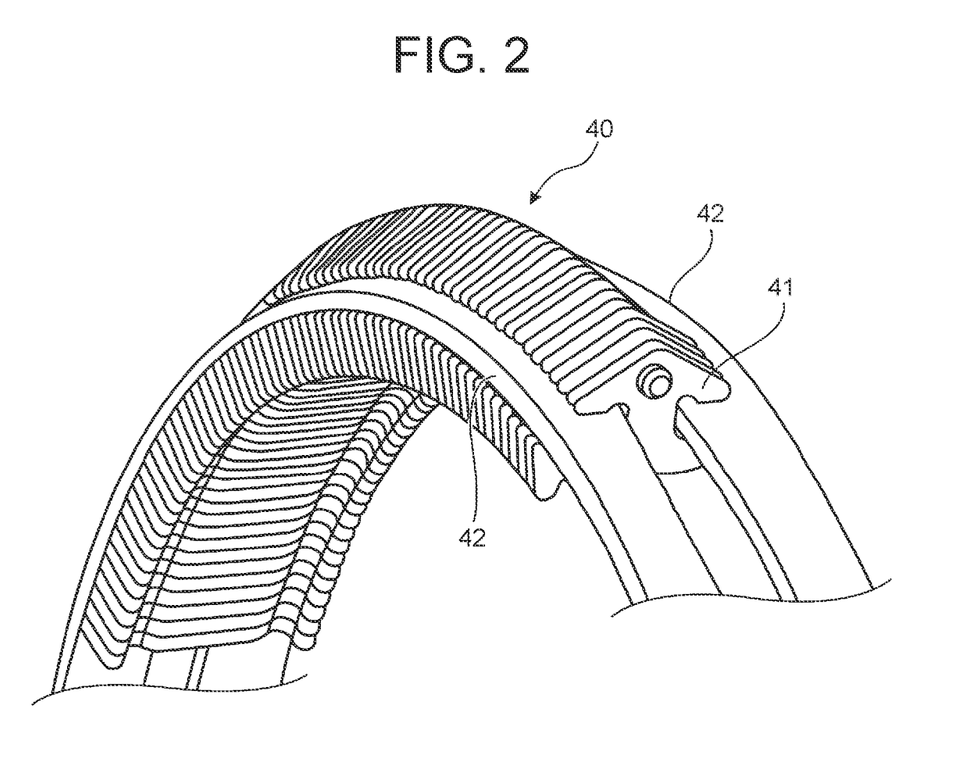
FIG. 2 is a perspective view of a part of the transmission belt shown in FIG. 1.
Figure 3:
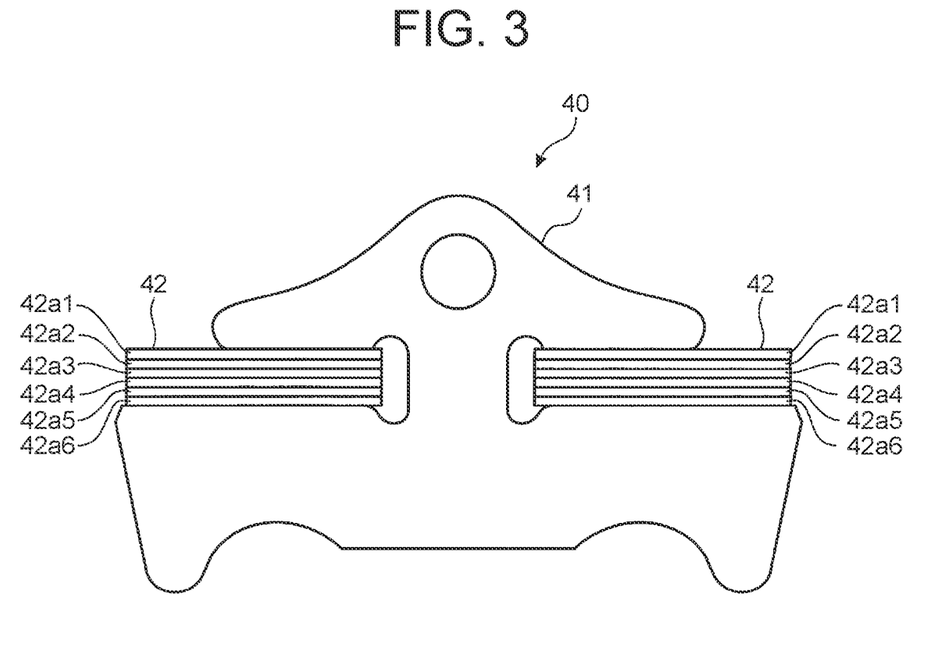
FIG. 3 is a front view of an element shown in FIG. 2.

FIG. 2 is a perspective view of a part of the transmission belt 40. FIG. 3 is a front view of an element 41. The transmission belt 40 is an endless metal belt provided by linking together a plurality of metal elements 41 into a circle by two layered rings 42 that are each provided by layering a plurality of metal rings 42a1 to 42a6 (see FIG. 3). Portions of both side surfaces of the elements 41 in a width direction of the transmission belt form contact surfaces that make contact with the tapered surfaces 21a, 22a, 31a, 32a of the fixed sheaves 21, 31 and the movable sheaves 22, 32. As the fixed sheaves 21, 31 and the movable sheaves 22, 32 hold the elements 41 therebetween, the elements 41 are subjected to a holding pressure. By the force of friction occurring between the tapered surfaces of the fixed sheaves 21, 31 and the movable sheaves 22, 32 and the contact surfaces of the elements 41, a drive force is transmitted between the primary pulley 20 and the secondary pulley 30 through the transmission belt 40.

Figure 4:
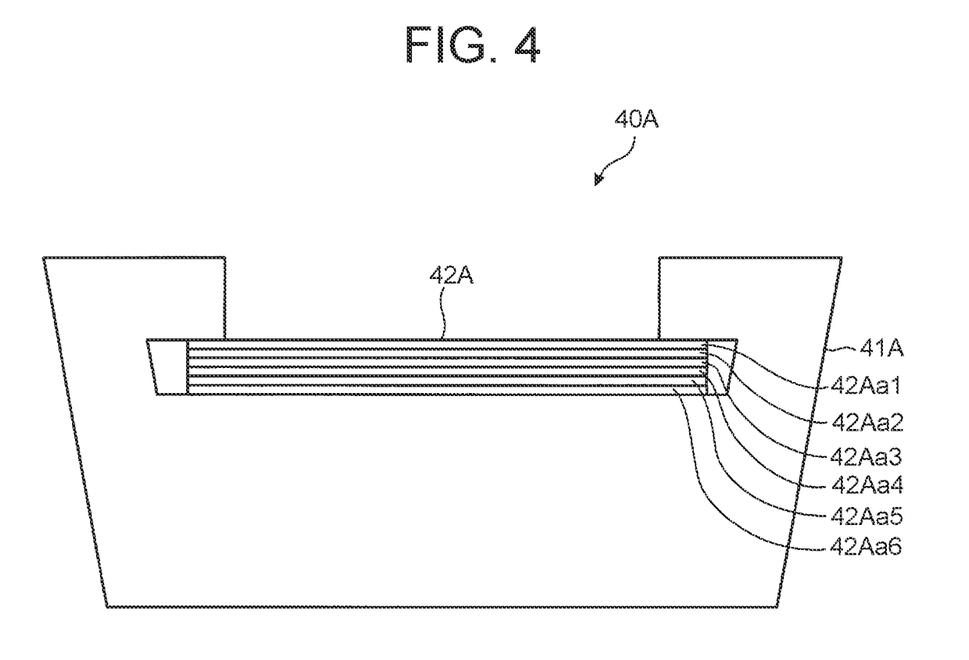
FIG. 4 is a front view showing a part of a transmission belt in another example that can be employed in the continuously variable transmission according to the embodiment.

FIG. 4 is a front view showing a part of a transmission belt 40A in another example that can be employed in the continuously variable transmission 5 according to the embodiment. The continuously variable transmission 5 according to the embodiment may employ the transmission belt 40A as shown in FIG. 4 that is provided by linking together elements 41A into a circle by one layered ring 42A that is provided by layering a plurality of metal rings 42Aa1 to 42Aa6. In the transmission belt 40A, both side portions of the elements 41A in a width direction are held in the V-grooves of the primary pulley 20 and the secondary pulley 30, and a force of friction is generated between these side portions and the tapered surfaces 21a, 22a, 31a, 32a.

In the continuously variable transmission 5, as the widths of the V-grooves of the primary pulley 20 and the secondary pulley 30 change, the ratio between the radius of the transmission belt 40 wrapped around the primary pulley 20 (hereinafter referred to as "the belt wrapping radius on the primary side") and the radius of the transmission belt 40 wrapped around the secondary pulley 30 (hereinafter referred to as "the belt wrapping radius on the secondary side") changes continuously. Thus, the gear ratio γ of the continuously variable transmission 5 can be steplessly changed.

When gear shift control for changing the gear ratio γ of the continuously variable transmission 5 is executed, an oil pressure in the primary-side first hydraulic chamber 23 is controlled to change the belt wrapping radii on the primary pulley 20 and the secondary pulley 30, and an oil pressure in the secondary-side second hydraulic chamber 33 is controlled to control a belt holding pressure in the continuously variable transmission 5 to an appropriate magnitude. The belt holding pressure refers to a force with which the tapered surfaces 21a, 31a on the fixed side and the tapered surfaces 22a, 32a on the movable side of the primary pulley 20 and the secondary pulley 30 hold the transmission belt 40 from both sides in the axial direction D1. As the belt holding pressure is controlled to an appropriate magnitude, an optimal force of friction occurs between each of the primary pulley 20 and the secondary pulley 30 and the transmission belt 40, and belt tension is secured between the primary pulley 20 and the secondary pulley 30. Power of which the speed has been changed in the continuously variable transmission 5 is output from the output gear 7 that rotates integrally with the output shaft 6.

The output gear 7 meshes with a counter driven gear 8a of the counter gear mechanism 8. Specifically, the output gear 7 that is a drive gear and the counter driven gear 8a that is a driven gear form a gear pair. The counter gear mechanism 8 is a speed reducing mechanism including the counter driven gear 8a, a counter drive gear 8b, and a counter shaft 8c that are configured to rotate integrally. The counter drive gear 8b meshes with a differential ring gear 9a of the differential mechanism 9. The left and right drive wheels 11 are coupled to the differential mechanism 9 through the left and right axles 10.

Figure 5:
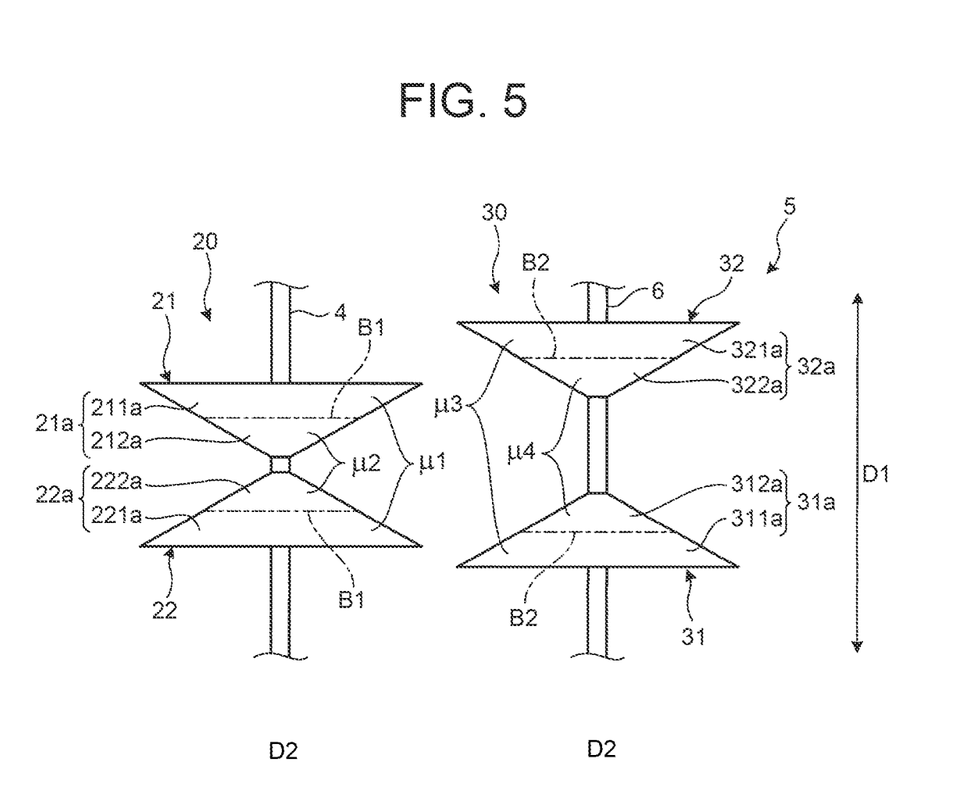
FIG. 5 is a view illustrating coefficients of friction of tapered surfaces of the primary pulley and the secondary pulley shown in FIG. 1.

Next, coefficients of friction of the tapered surfaces 21a, 22a, 31a, 32a of the fixed sheaves 21, 31 and the movable sheaves 22, 32 of the primary pulley 20 and the secondary pulley 30 relative to the contact surfaces of the elements 41 of the transmission belt 40 will be described. FIG. 5 is a view illustrating the coefficients of friction of the tapered surfaces 21a, 22a, 31a, 32a of the primary pulley 20 and the secondary pulley 30.

As shown in FIG. 5, in the tapered surface 21a of the fixed sheave 21 of the primary pulley 20, a low coefficient-of-friction region 211a and a high coefficient-of-friction region 212a that are two regions with different coefficients of friction are formed next to each other in a radial direction D2. The low coefficient-of-friction region 211a is a region at an outer portion of the tapered surface 21a in the radial direction D2 and has a low coefficient of friction µ1 that is a relatively low coefficient of friction. The high coefficient-of-friction region 212a is a region at an inner portion of the tapered surface 21a in the radial direction D2 and has a high coefficient of friction µ2 that is a high coefficient of friction relative to the low coefficient of friction µ1.

Further, as shown in FIG. 5, in the tapered surface 22a of the movable sheave 22 of the primary pulley 20, a low coefficient-of-friction region 221a and a high coefficient-of-friction region 222a that are two regions with different coefficients of friction are formed next to each other in the radial direction D2. The low coefficient-of-friction region 221a is a region at an outer portion of the tapered surface 22a in the radial direction D2 and has the low coefficient of friction µ1 that is a relatively low coefficient of friction. The high coefficient-of-friction region 222a is a region at an inner portion of the tapered surface 22a in the radial direction D2 and has the high coefficient of friction µ2 that is a high coefficient of friction relative to the low coefficient of friction µ1.

A border B1 between the low coefficient-of-friction regions 211a, 221a and the high coefficient-of-friction regions 212a, 222a of the tapered surfaces 21a, 22a in the radial direction D2 may be located, for example, at a position at which the tapered surfaces 21a, 22a are halved in the radial direction D2, or at or near a position at which the transmission belt 40 wraps around the primary pulley 20 when the gear ratio γ of the continuously variable transmission 5 is one. In the continuously variable transmission 5 according to the embodiment, the transmission belt 40 runs on such a belt track, at least at a minimum gear ratio γmin, that the elements 41 of the transmission belt 40 make contact with the low coefficient-of-friction regions 211a, 221a. In the continuously variable transmission 5 according to the embodiment, the transmission belt 40 runs on such a belt track, at least at a maximum gear ratio γmax, that the elements 41 of the transmission belt 40 make contact with the high coefficient-of-friction regions 212a, 222a.

Next, as shown in FIG. 5, in the tapered surface 31a of the fixed sheave 31 of the secondary pulley 30, a low coefficient-of-friction region 311a and a high coefficient-of-friction region 312a that are two regions with different coefficients of friction are formed next to each other in the radial direction D2. The low coefficient-of-friction region 311a is a region at an outer portion of the tapered surface 31a in the radial direction D2 and has a low coefficient of friction µ3 that is a relatively low coefficient of friction. The high coefficient-of-friction region 312a is a region at an inner portion of the tapered surface 31a in the radial direction D2 and has a high coefficient of friction µ4 that is a high coefficient of friction relative to the low coefficient of friction µ3.

Further, as shown in FIG. 5, in the tapered surface 32a of the movable sheave 32 of the secondary pulley 30, a low coefficient-of-friction region 321a and a high coefficient-of-friction region 322a that are two regions with different coefficients of friction are formed next to each other in the radial direction D2. The low coefficient-of-friction region 321a is a region at an outer portion of the tapered surface 32a in the radial direction D2 and has the low coefficient of friction μ3 that is a relatively low coefficient of friction. The high coefficient-of-friction region 322a is a region at an inner portion of the tapered surface 32a in the radial direction D2 and has the high coefficient of friction μ4 that is a high coefficient of friction relative to the low coefficient of friction μ3.

A border B2 between the low coefficient-of-friction regions 311a, 321a and the high coefficient-of-friction regions 312a, 322a of the tapered surfaces 31a, 32a in the radial direction D2 may be located, for example, at a position at which the tapered surfaces 31a, 32a are halved in the radial direction D2, or at or near a position at which the transmission belt 40 wraps around the secondary pulley 30 when the gear ratio γ of the continuously variable transmission 5 is one. In the continuously variable transmission 5 according to the embodiment, the transmission belt 40 runs on such a belt track, at least at the minimum gear ratio γmin, that the elements 41 of the transmission belt 40 make contact with the high coefficient-of-friction regions 312a, 322a. In the continuously variable transmission 5 according to the embodiment, the transmission belt 40 runs on such a belt track, at least at the maximum gear ratio γmax, that the elements 41 of the transmission belt 40 make contact with the low coefficient-of-friction regions 311a, 321a.

The coefficients of friction of the tapered surfaces 21a, 22a, 31a, 32a can be adjusted, for example, by surface-treating the tapered surfaces 21a, 22a, 31a, 32a so as to differentiate the surface roughness (arithmetic mean roughness Ra; a mean width of profile elements Rsm) between the outer portion and the inner portion in the radial direction D2. In this embodiment, the low coefficient of friction μ1 and the low coefficient of friction μ3 are equal values, and the high coefficient of friction μ2 and the high coefficient of friction μ4 are equal values. For example, the low coefficients of frictions μ1, μ3 are 0.09 and the high coefficients of friction μ2, μ4 are 1.2 in this embodiment, but these coefficients of friction are not limited thereto.

In the continuously variable transmission 5 according to the embodiment, the transmission belt 40 runs on such a belt track at the maximum gear ratio γmax that the high coefficient-of-friction regions 212a, 222a of the primary pulley 20 and the elements 41 of the transmission belt 40 make contact with each other, and that the low coefficient-of-friction regions 311a, 321a of the secondary pulley 30 and the elements 41 of the transmission belt 40 make contact with each other.

Figure 6:
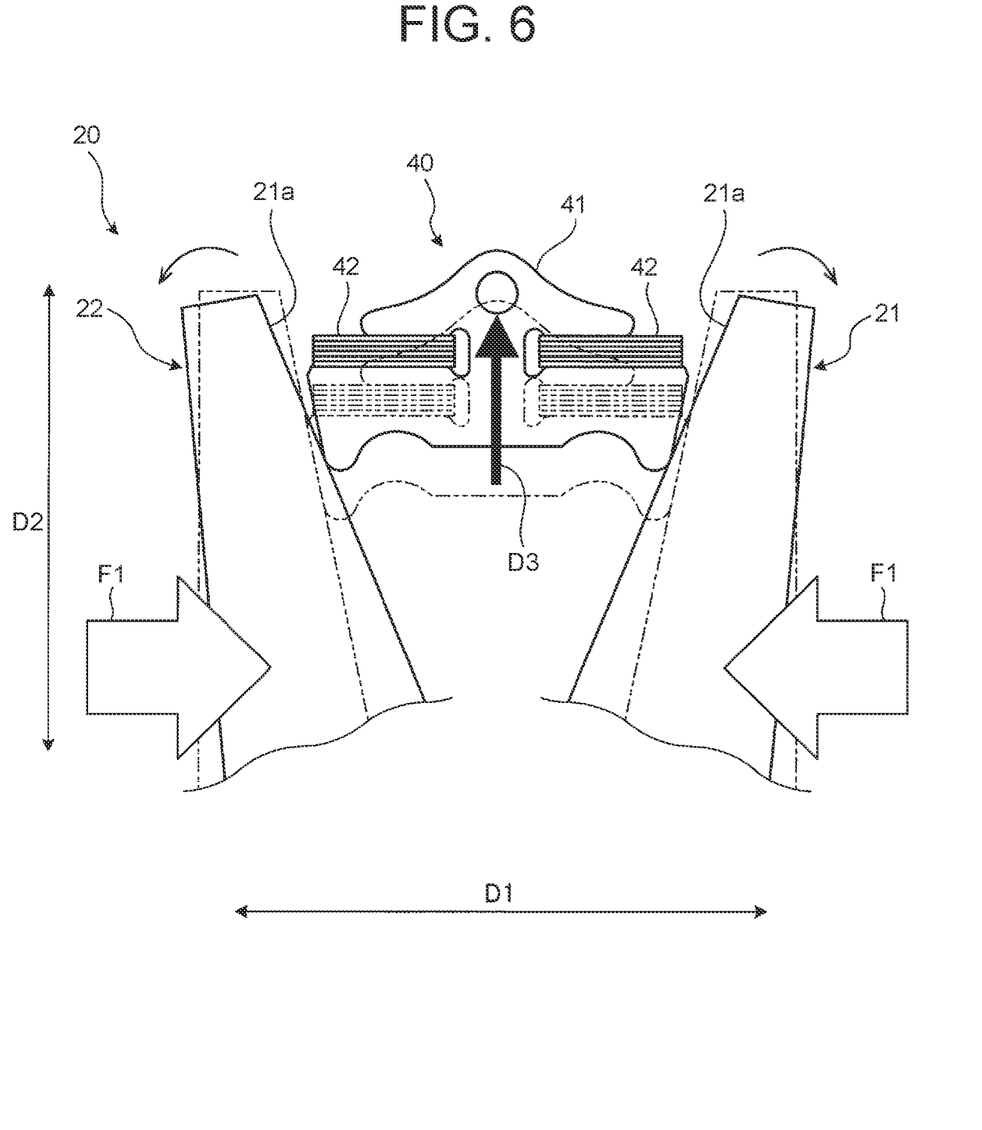
FIG. 6 is a view illustrating sheave deformation of the primary pulley.

FIG. 6 is a view illustrating sheave deformation of the primary pulley 20. In the continuously variable transmission 5, at the minimum gear ratio γmin within the range between the maximum gear ratio γmax and the minimum gear ratio γmin, the width of the V-groove of the primary pulley 20 becomes narrowest and the transmission belt 40 runs on such a belt track as to wrap around the outer portions of the tapered surfaces 21a, 22a. Setting the transmission belt 40 on the belt track for the minimum gear ratio γmin in the primary pulley 20 requires a predetermined ring push-up force with which the layered rings 42 are pushed out outward in the radial direction D2 by the elements 41. The magnitude of this ring push-up force is determined by a thrust force exerted in the primary pulley 20 and the coefficients of friction of the tapered surfaces 21a, 22a.

As shown in FIG. 6, when the thrust force exerted in the primary pulley 20 at the minimum gear ratio γmin is set to a relatively large thrust force F1 so as to maintain the narrow width of the V-groove, this thrust force F1 causes sheave deformation in which the fixed sheave 21 and the movable sheave 22 warp outward in the axial direction D1. When such sheave deformation occurs, for example, at the side of the primary pulley 20 where the transmission belt 40 enters the primary pulley 20 from the secondary pulley 30, the elements 41 of the transmission belt 40 move outward in the radial direction D2 (the direction of arrow D3 in FIG. 6) compared with when the sheaves are not deformed. This results in a phenomenon called spiral run in which the transmission belt 40 runs on a belt track that has shifted in the radial direction in response to sheave deformation. When this spiral run occurs, for example, at the side of the primary pulley 20 where the transmission belt 40 enters the primary pulley 20, the area of contact between each of the tapered surfaces 21a, 22a and the elements 41 becomes smaller than that when spiral run has not occurred, so that the torque transmitting region decreases. Thus, when spiral run occurs at the minimum gear ratio γmin, a power transmission loss occurs between the tapered surfaces 21a, 22a and the elements 41, in other words, between the primary pulley 20 and the transmission belt 40.

In the continuously variable transmission 5 according to the embodiment, the transmission belt 40 runs on such a belt track at the minimum gear ratio γmin that the low coefficient-of-friction regions 211a, 221a of the primary pulley 20 and the elements 41 of the transmission belt 40 make contact with each other, and that the high coefficient-of-friction regions 312a, 322a of the secondary pulley 30 and the elements 41 of the transmission belt 40 make contact with each other. In other words, in the belt track for the transmission belt 40 to run on at the minimum gear ratio γmin in the continuously variable transmission 5 according to the embodiment, a coefficient of friction of each of the tapered surfaces 21a, 22a of the fixed sheave 21 and the movable sheave 22 of the primary pulley 20 relative to the transmission belt 40 at the portion in contact with the transmission belt 40 is lower than a coefficient of friction of each of the tapered surfaces 31a, 32a of the fixed sheave 31 and the movable sheave 32 of the secondary pulley 30 relative to the transmission belt 40 at the portion in contact with the transmission belt 40.

Here, if the magnitude of the thrust force exerted in the primary pulley 20 is the same, the lower the coefficients of friction of the tapered surfaces 21a, 22a become, the smaller the force of friction becomes that occurs between the tapered surfaces 21a, 22a and the elements 41 when the elements 41 move outward in the radial direction D2 along the tapered surfaces 21a, 22a during gear shift to the minimum gear ratio γmin. Further, if the magnitude of the thrust force is the same, the smaller this force of friction becomes, the larger the ring push-up force becomes with which the layered rings 42 of the transmission belt 40 are pushed up outward in the radial direction D2 by the elements 41 when the elements 41 are moved outward in the radial direction D2 along the tapered surfaces 21a, 22a against the force of friction.

Figure 7:
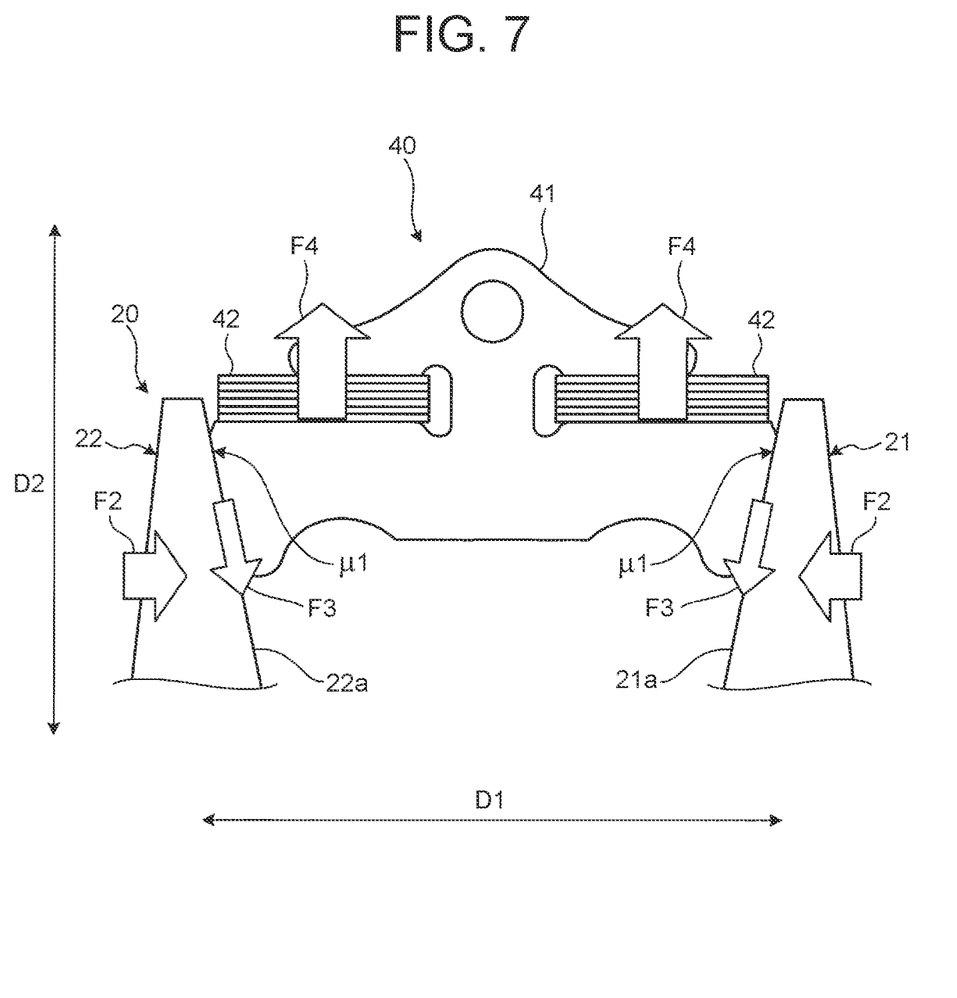
FIG. 7 is a view illustrating a force of friction and a ring push-up force in a case where an outer portion of each tapered surface of the primary pulley has a low coefficient of friction.
Figure 8:
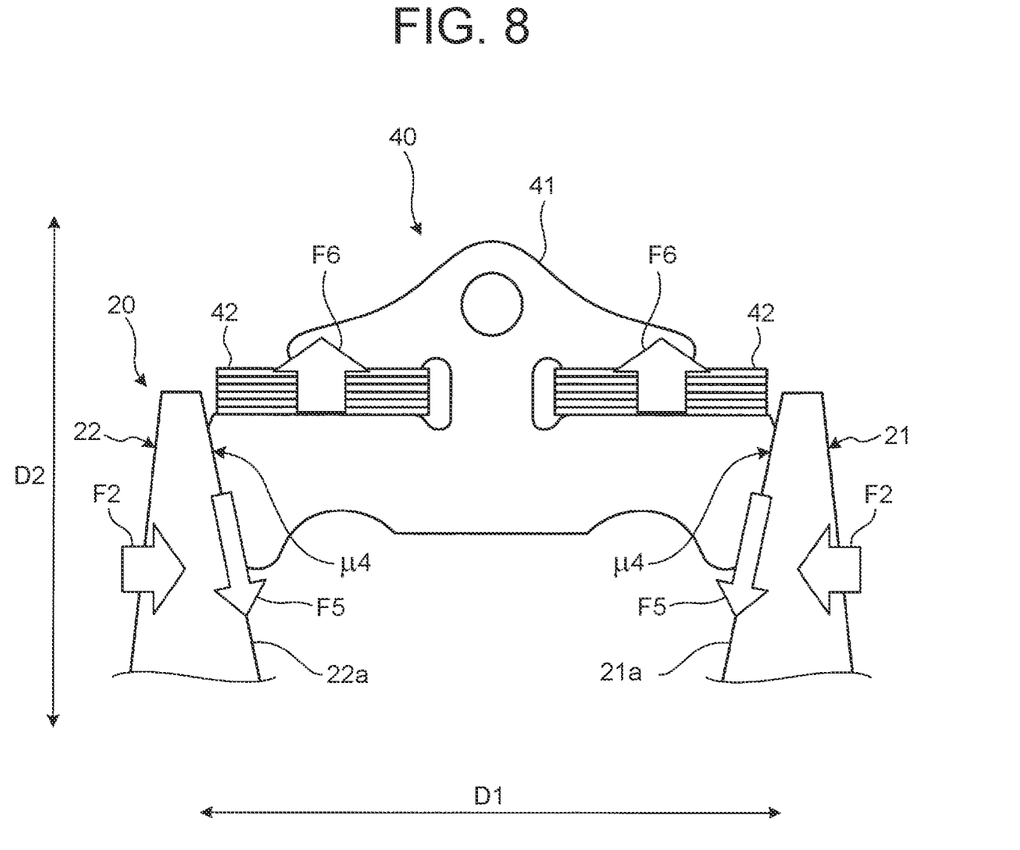
FIG. 8 is a view illustrating a force of friction and a ring push-up force in a case where the outer portion of each tapered surface of the primary pulley has a high coefficient of friction equal to that of a high coefficient-of-friction region of the secondary pulley.

FIG. 7 is a view illustrating a force of friction and a ring push-up force in a case where the outer portions of the tapered surfaces 21a, 22a of the primary pulley 20 have the low coefficient of friction μ1. FIG. 8 is a view illustrating a force of friction and a ring push-up force in a case where the outer portions of the tapered surfaces 21a, 22a of the primary pulley 20 have the high coefficient of friction $\mu 4$ equal to the coefficients of friction of the high coefficient-of-friction regions 312a, 322a of the secondary pulley 30.

A comparison between when the outer portions of the tapered surfaces 21a, 22a of the primary pulley 20 have the low coefficient of friction $\mu 1$ shown in FIG. 7 and when they have the high coefficient of friction $\mu 4$ shown in FIG. 8 shows that, if the thrust force is the same thrust force F2, a force of friction F3 at the low coefficient of friction $\mu 1$ shown in FIG. 7 is smaller than a force of friction F5 at the high coefficient of friction $\mu 4$ shown in FIG. 8. Therefore, if the thrust force is the same thrust force F2, a ring push-up force F4 at the low coefficient of friction $\mu 1$ shown in FIG. 7 is larger than a ring push-up force F6 at the high coefficient of friction $\mu 4$ shown in FIG. 8.

Figure 9:
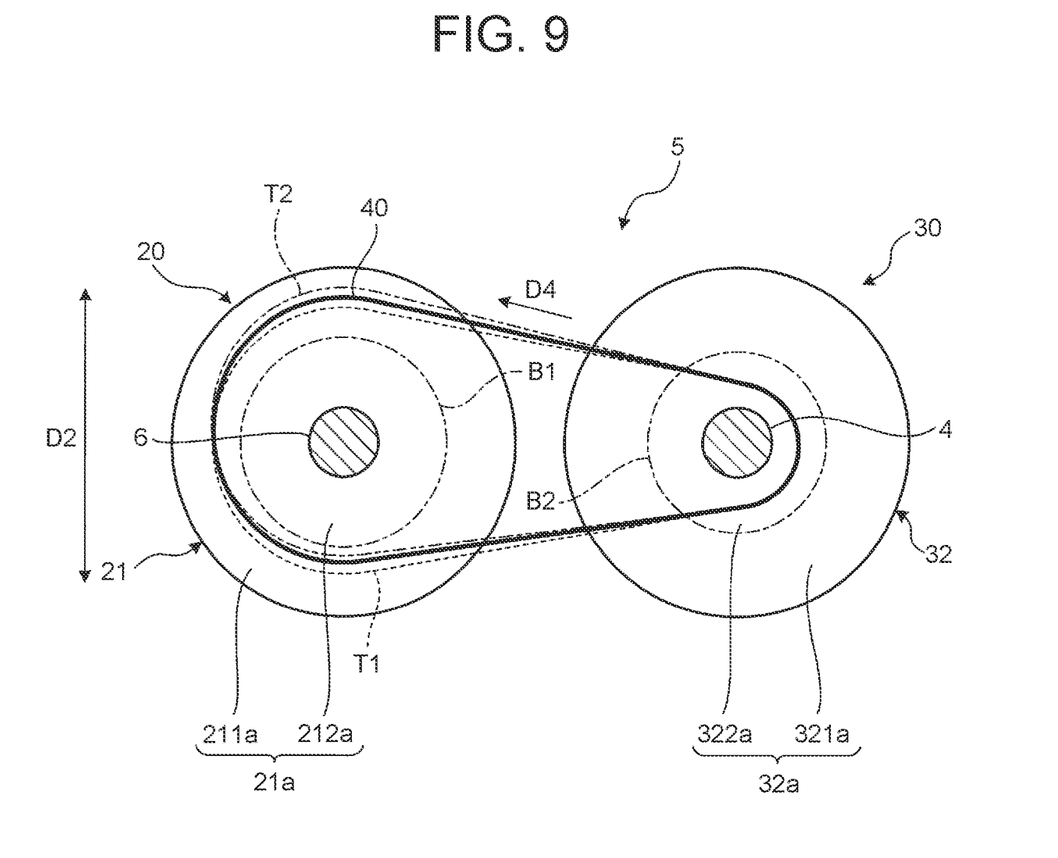
FIG. 9 is a view showing belt tracks of the continuously variable transmission at a minimum gear ratio.

FIG. 9 is a view showing belt tracks for the minimum gear ratio γmin. Arrow D4 in FIG. 9 indicates a running direction of the transmission belt 40. A belt track T1 indicated by the dashed line in FIG. 9 is an ideal belt track for the minimum gear ratio γmin. A belt track T2 indicated by the long dashed double-short dashed line in FIG. 9 is a belt track resulting from spiral run at the minimum gear ratio γmin.

As shown in FIG. 9, in the continuously variable transmission 5 according to the embodiment, the outer portions of the tapered surfaces 21a, 22a of the primary pulley 20 that form the belt track for the minimum gear ratio γmin are designated as the low coefficient-of-friction regions 211a, 221a with the low coefficient of friction $\mu 1$. Thus, compared with when the tapered surfaces 21a, 22a have the high coefficient of friction $\mu 4$ equal to the coefficients of friction of the high coefficient-of-friction regions 312a, 322a of the secondary pulley 30 that form the belt track for the minimum gear ratio γmin, the thrust force exerted in the primary pulley 20 can be reduced while the predetermined ring push-up force at the minimum gear ratio γmin is maintained. Since the thrust force exerted in the primary pulley 20 at the minimum gear ratio γmin can be thus reduced, the sheave deformation of the primary pulley 20 can be mitigated accordingly, so that shift of the belt track resulting from spiral run can be reduced from the belt track T2 to bring the belt track closer to the ideal belt track T1. In this way, the continuously variable transmission 5 according to the embodiment can reduce the power transmission loss between the tapered surfaces 21a, 22a and the elements 41, in other words, between the primary pulley 20 and the transmission belt 40, at the minimum gear ratio γmin.

In the continuously variable transmission 5, at the minimum gear ratio γmin, the width of the V-groove of the secondary pulley 30 becomes widest and the transmission belt 40 runs on such a belt track as to wrap around the inner portions of the tapered surfaces 31a, 32a. The thrust force exerted in the secondary pulley 30 at the minimum gear ratio γmin is relatively small. In the continuously variable transmission 5 according to the embodiment, therefore, the inner portions of the tapered surfaces 31a, 32a of the secondary pulley 30 that form the belt track for the minimum gear ratio γmin are designated as the high coefficient-of-friction regions 312a, 322a with the high coefficient of friction $\mu 4$. Thus, compared with when the tapered surfaces 31a, 32a have the low coefficient of friction $\mu 1$ equal to the coefficients of friction of the low coefficient-of-friction regions 211a, 221a of the primary pulley 20 that form the belt track for the minimum gear ratio γmin, the force of friction occurring between the high coefficient-of-friction regions 312a, 322a of the tapered surfaces 31a, 32a and the elements 41 of the transmission belt 40 can be relatively increased even when the thrust force is relatively small, so that a decrease in the torque transmission capacity can be avoided. In this way, the continuously variable transmission 5 according to the embodiment can reduce the power transmission loss between the tapered surfaces 31a, 32a and the elements 41, in other words, between the secondary pulley 30 and the transmission belt 40, at the minimum gear ratio γmin. Since the force of friction occurring between the high coefficient-of-friction regions 312a, 322a of the tapered surfaces 31a, 32a and the elements 41 of the transmission belt 40 can be relatively increased, the transmission belt 40 is less likely to slip over the tapered surfaces 31a, 32a, so that power transmission loss between the secondary pulley 30 and the transmission belt 40 can be reduced. Moreover, at the minimum gear ratio γmin, the predetermined ring push-up force with which the elements 41 of the transmission belt 40 in contact with the tapered surfaces 31a, 32a push up the layered rings 42 outward in the radial direction D2 is less likely to become relatively so large that the belt track shifts and that the force pulling the layered rings 42 becomes large on the side of the secondary pulley 30. Thus, the amount of spiral run (shift of the belt track) that causes a power transmission loss can be kept down.

Figure 10:
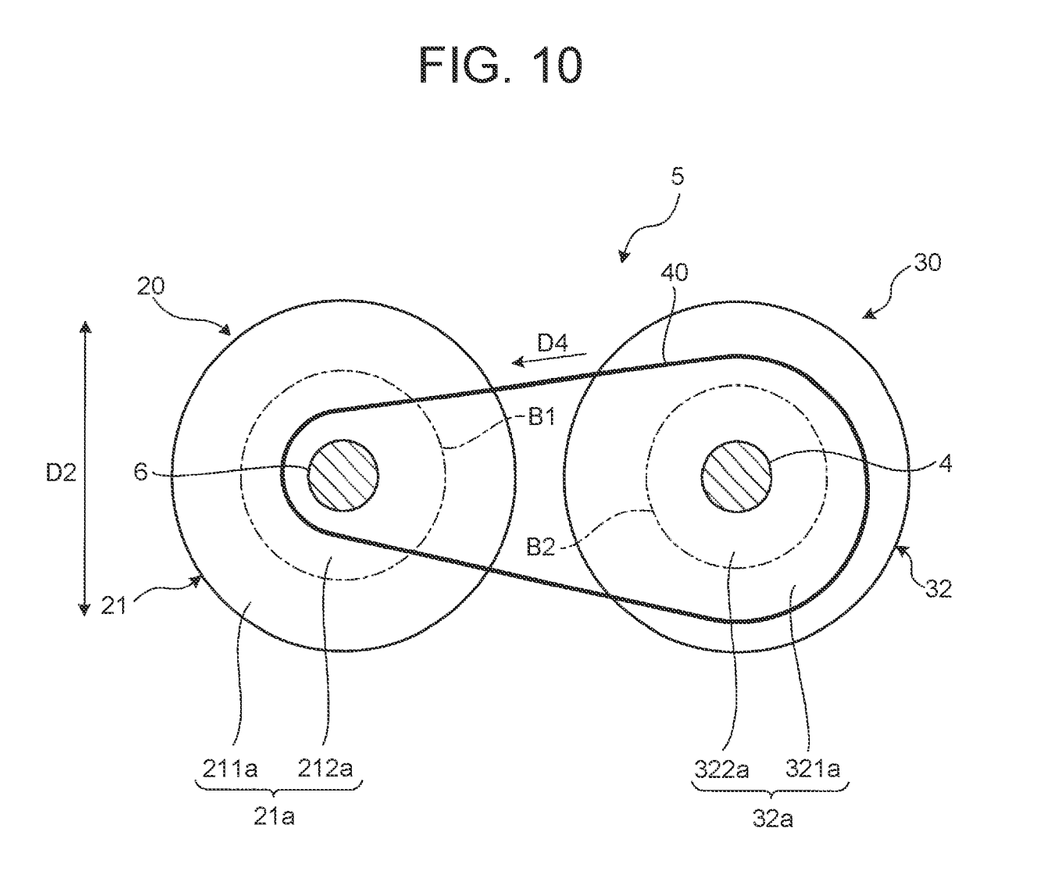
FIG. 10 is a view showing a belt track of the continuously variable transmission at a maximum gear ratio.

FIG. 10 is a view showing a belt track for the maximum gear ratio γmax. In the continuously variable transmission 5 according to the embodiment, the transmission belt 40 runs on such a belt track at the maximum gear ratio γmax that the high coefficient-of-friction regions 212a, 222a of the primary pulley 20 and the elements 41 of the transmission belt 40 make contact with each other, and that the low coefficient-of-friction regions 311a, 321a of the secondary pulley 30 and the elements 41 of the transmission belt 40 make contact with each other. In other words, in the belt track for the transmission belt 40 to run on at the maximum gear ratio γmax in the continuously variable transmission 5 according to the embodiment, a coefficient of friction of each of the tapered surfaces 31a, 32a of the fixed sheave 31 and the movable sheave 32 of the secondary pulley 30 relative to the transmission belt 40 at the portion in contact with the transmission belt 40 is lower than a coefficient of friction of each of the tapered surfaces 21a, 22a of the fixed sheave 21 and the movable sheave 22 of the primary pulley 20 relative to the transmission belt 40 at the portion in contact with the transmission belt 40.

In the continuously variable transmission 5, at the maximum gear ratio γmax within the range between the maximum gear ratio γmax and the minimum gear ratio γmin, the width of the V-groove of the primary pulley 20 becomes widest and the transmission belt 40 runs on such a belt track as to wrap around the inner portions of the tapered surfaces 31a, 32a. The thrust force exerted in the primary pulley 20 at the maximum gear ratio γmax is relatively small. In the continuously variable transmission 5 according to the embodiment, therefore, the inner portions of the tapered surfaces 21a, 22a of the primary pulley 20 that form the belt track for the maximum gear ratio γmax are designated as the high coefficient-of-friction regions 212a, 222a with the high coefficient of friction $\mu 2$. Thus, compared with when the inner portions of the tapered surfaces 21a, 22a have the low coefficient of friction $\mu 3$ equal to the coefficients of friction of the low coefficient-of-friction regions 311a, 321a of the secondary pulley 30 that form the belt track for the maximum gear ratio γmax, the force of friction occurring between the high coefficient-of-friction regions 212a, 222a of the tapered surfaces 21a, 22a and the elements 41 of the transmission belt 40 can be relatively increased even when the thrust force is relatively small, so that a decrease in the torque transmission capacity can be avoided. In this way, the continuously variable transmission 5 according to the embodiment can reduce the power transmission loss between the tapered surfaces 21a, 22a and the elements 41, in other words, between the primary pulley 20 and the transmission belt 40, at the maximum gear ratio γmax.

In the continuously variable transmission 5, at the maximum gear ratio γmax within the range between the maximum gear ratio γmax and the minimum gear ratio γmin, the width of the V-groove of the secondary pulley 30 becomes narrowest and the transmission belt 40 runs on such a belt track as to wrap around the outer portions of the tapered surfaces 31a, 32a. The thrust force exerted in the secondary pulley 30 at the maximum gear ratio γmax is relatively large. In the continuously variable transmission 5 according to the embodiment, therefore, the outer portions of the tapered surfaces 31a, 32a of the secondary pulley 30 that form the belt track for the maximum gear ratio γmax are designated as the low coefficient-of-friction regions 311a, 321a with the low coefficient of friction μ3. Thus, compared with when the outer portions of the tapered surfaces 31a, 32a have the high coefficient of friction μ2 equal to the coefficients of friction of the high coefficient-of-friction regions 212a, 222a of the primary pulley 20 that form the belt track for the maximum gear ratio γmax, the thrust force exerted in the secondary pulley 30 can be reduced while the predetermined ring push-up force at the maximum gear ratio γmax is maintained. Since the thrust force exerted in the secondary pulley 30 at the maximum gear ratio γmax can be thus reduced, the sheave deformation in the secondary pulley 30 can be mitigated accordingly, so that spiral run (shift of the belt track) can be reduced. In this way, the continuously variable transmission 5 according to the embodiment can reduce the power transmission loss between the tapered surfaces 31a, 32a and the elements 41, in other words, between the secondary pulley 30 and the transmission belt 40, at the maximum gear ratio γmax.

What is claimed is:

1. A continuously variable transmission comprising:
   a first pulley including a first fixed sheave that is fixed to a first rotating shaft and a first movable sheave that rotates integrally with the first rotating shaft and is movable along the first rotating shaft, the first pulley being configured such that power from a power source mounted in a vehicle is transmitted to the first pulley through the first rotating shaft;
   a first thrust-force generating device configured to generate a thrust force that pushes the first movable sheave toward the first fixed sheave;
   a second pulley including a second fixed sheave that is fixed to a second rotating shaft and a second movable sheave that rotates integrally with the second rotating shaft and is movable along the second rotating shaft, the second pulley being configured to transmit power to a drive wheel of the vehicle through the second rotating shaft;
   a second thrust-force generating device configured to generate a thrust force that pushes the second movable sheave toward the second fixed sheave; and
   a transmission belt configured to transmit power by being wrapped around a first belt wrapping groove formed in the first pulley by tapered surfaces, facing each other, of the first fixed sheave and the first movable sheave and around a second belt wrapping groove formed in the second pulley by tapered surfaces, facing each other, of the second fixed sheave and the second movable sheave,
   wherein the continuously variable transmission is configured to steplessly change a gear ratio within a range between a maximum gear ratio and a minimum gear ratio by continuously changing a width of the first belt wrapping groove and a width of the second belt wrapping groove,
   wherein, in a belt track for the transmission belt to run on at the minimum gear ratio, a coefficient of friction of each of the tapered surfaces of the first fixed sheave and the first movable sheave relative to the transmission belt at a portion in contact with the transmission belt is lower than a coefficient of friction of each of the tapered surfaces of the second fixed sheave and the second movable sheave at a portion in contact with the transmission belt, and
   wherein a coefficient of friction of each of the tapered surfaces of the first fixed sheave and the first movable sheave relative to the transmission belt at a radially outer portion is lower than a coefficient of friction of each of the tapered surfaces of the first fixed sheave and the first movable sheave relative to the transmission belt at a radially inner portion.

2. The continuously variable transmission according to claim 1, wherein a coefficient of friction of each of the tapered surfaces of the second fixed sheave and the second movable sheave relative to the transmission belt at a radially inner portion is higher than a coefficient of friction of each of the tapered surfaces of the second fixed sheave and the second movable sheave relative to the transmission belt at a radially outer portion.

3. The continuously variable transmission according to claim 1, wherein, in a belt track for the transmission belt to run on at the maximum gear ratio, a coefficient of friction of each of the tapered surfaces of the second fixed sheave and the second movable sheave relative to the transmission belt at a portion in contact with the transmission belt is lower than a coefficient of friction of each of the tapered surfaces of the first fixed sheave and the first movable sheave at a portion in contact with the transmission belt.

4. The continuously variable transmission according to claim 1, wherein the transmission belt is a metal belt provided by threading, through a circular ring, a plurality of elements of which both side surfaces in a width direction make contact with the tapered surfaces.

5. The continuously variable transmission according to claim 4, wherein the circular ring is a ring provided by layering a plurality of rings.

6. A continuously variable transmission comprising:
   a first pulley including a first fixed sheave that is fixed to a first rotating shaft and a first movable sheave that rotates integrally with the first rotating shaft and is movable along the first rotating shaft, the first pulley being configured such that power from a power source mounted in a vehicle is transmitted to the first pulley through the first rotating shaft;
   a first thrust-force generating device configured to generate a thrust force that pushes the first movable sheave toward the first fixed sheave;
   a second pulley including a second fixed sheave that is fixed to a second rotating shaft and a second movable sheave that rotates integrally with the second rotating shaft and is movable along the second rotating shaft, the second pulley being configured to transmit power to a drive wheel of the vehicle through the second rotating shaft;

a second thrust-force generating device configured to generate a thrust force that pushes the second movable sheave toward the second fixed sheave; and a transmission belt configured to transmit power by being wrapped around a first belt wrapping groove formed in the first pulley by tapered surfaces, facing each other, of the first fixed sheave and the first movable sheave and around a second belt wrapping groove formed in the second pulley by tapered surfaces, facing each other, of the second fixed sheave and the second movable sheave, wherein the continuously variable transmission is configured to steplessly change a gear ratio within a range between a maximum gear ratio and a minimum gear ratio by continuously changing a width of the first belt wrapping groove and a width of the second belt wrapping groove, wherein, in a belt track for the transmission belt to run on at the minimum gear ratio, a coefficient of friction of each of the tapered surfaces of the first fixed sheave and the first movable sheave relative to the transmission belt at a portion in contact with the transmission belt is lower than a coefficient of friction of each of the tapered surfaces of the second fixed sheave and the second movable sheave at a portion in contact with the transmission belt, and wherein a coefficient of friction of each of the tapered surfaces of the second fixed sheave and the second movable sheave relative to the transmission belt at a radially inner portion is higher than a coefficient of friction of each of the tapered surfaces of the second fixed sheave and the second movable sheave relative to the transmission belt at a radially outer portion.

\* \* \* \* \*